US007110367B2

United States Patent
Moriya

(10) Patent No.: US 7,110,367 B2
(45) Date of Patent: Sep. 19, 2006

(54) DYNAMIC ROUTING CONTROL SYSTEM AND METHOD FOR RADIO ACCESS NETWORK

(75) Inventor: Hitoshi Moriya, Tokyo (JP)

(73) Assignee: NEC Corporation, Tokyo (JP)

( * ) Notice: Subject to any disclaimer, the term of this patent is extended or adjusted under 35 U.S.C. 154(b) by 913 days.

(21) Appl. No.: 09/944,203

(22) Filed: Sep. 4, 2001

(65) Prior Publication Data

US 2002/0027887 A1 Mar. 7, 2002

(30) Foreign Application Priority Data

Sep. 4, 2000 (JP) ............................. 2000-267484

(51) Int. Cl.
*H04L 12/44* (2006.01)
(52) U.S. Cl. ...................................... 370/256; 370/408
(58) Field of Classification Search ........ 370/254–258, 370/395.1, 351, 312, 328, 338, 346; 709/220, 709/221
See application file for complete search history.

(56) References Cited

U.S. PATENT DOCUMENTS 5,079,767 A * 1/1992 Perlman ..................... 370/408
5,430,730 A * 7/1995 Sepulveda-Garese et al. .... 370/254
5,517,494 A * 5/1996 Green ......................... 370/408
6,122,283 A * 9/2000 Lee ............................ 370/408
6,496,510 B1 * 12/2002 Tsukakoshi et al. ......... 370/401
6,826,165 B1 * 11/2004 Meier et al. ................. 370/338
2005/0083936 A1* 4/2005 Ma ............................. 370/392

FOREIGN PATENT DOCUMENTS

| JP | 6-237271 A | 8/1994 |
| JP | 7-327042 A | 12/1995 |
| JP | 9-83528 A | 3/1997 |
| JP | 11-32080 A | 2/1999 |
| JP | 11-355337 A | 12/1999 |

* cited by examiner

*Primary Examiner*—Hassan Kizou
*Assistant Examiner*—Salman Ahmed
(74) *Attorney, Agent, or Firm*—Sughrue Mion, PLLC

(57) ABSTRACT

A routing control system comprising a spanning tree producing portion provided in a master node of a radio access network. The spanning tree producing portion produces a spanning tree of the network whenever it receives connection information sent from slave nodes of the network. The spanning tree is delivered to each slave node. A memorizing portion is provided in each of the nodes and memorizes the spanning tree as a routing table. A health check portion is provided in each of the nodes and transmits the connection information to the spanning tree producing portion when topology change of the network is detected. The said health check portion updates the routing table in cooperation with those of adjacent nodes.

20 Claims, 11 Drawing Sheets

| RADIO BS NO. | IP ADDRESS |
|---|---|
| 1 | 172.17.1.1 |
| 2 | 172.17.1.2 |
| 3 | 172.17.1.3 |
| 4 | 172.17.1.4 |
| 5 | 172.17.1.5 |
| 6 | 172.17.1.6 |
| 7 | 172.17.1.7 |
| 8 | 172.17.1.8 |

| RADIO BS NO. | PORT NO. | 1st IP ADDRESS | 2nd IP ADDRESS | COST | CONNECTION / DISCONNECTION |
|---|---|---|---|---|---|
| 1 | ① | 172.17.1.2 | 172.17.1.1 | 1 | 1 |
| 2 | ① | 172.17.1.1 | 172.17.1.2 | 1 | 1 |
|   | ② | 172.17.1.3 | 172.17.1.2 | 1 | 1 |
|   | ③ | 172.17.1.5 | 172.17.1.2 | 1 | 1 |
| 3 | ① | 172.17.1.2 | 172.17.1.3 | 1 | 1 |
|   | ② | 172.17.1.4 | 172.17.1.3 | 1 | 1 |
| 4 | ① | 172.17.1.3 | 172.17.1.4 | 1 | 1 |
| 5 | ① | 172.17.1.2 | 172.17.1.5 | 1 | 1 |
|   | ② | 172.17.1.6 | 172.17.1.5 | 1 | 1 |
|   | ③ | 172.17.1.8 | 172.17.1.5 | 1 | 1 |
| 6 | ① | 172.17.1.5 | 172.17.1.6 | 1 | 1 |
|   | ② | 172.17.1.7 | 172.17.1.6 | 1 | 1 |
| 7 | ① | 172.17.1.6 | 172.17.1.7 | 1 | 1 |
|   | ② | 172.17.1.8 | 172.17.1.7 | 1 | 0 |
| 8 | ① | 172.17.1.5 | 172.17.1.8 | 1 | 1 |
|   | ② | 172.17.1.7 | 172.17.1.8 | 1 | 0 |

VERSION 1

FIG. 5

| RADIO BS NO. | PORT NO. | 1st IP ADDRESS | 2nd IP ADDRESS | COST | CONNECTION / DISCONNECTION |
|---|---|---|---|---|---|
| 1 | ① | 172.17.1.2 | 172.17.1.1 | 1 | 1 |
| 2 | ① | 172.17.1.1 | 172.17.1.2 | 1 | 1 |
|   | ② | 172.17.1.3 | 172.17.1.2 | 1 | 1 |
|   | ③ | 172.17.1.5 | 172.17.1.2 | 1 | 1 |
| 3 | ① | 172.17.1.2 | 172.17.1.3 | 1 | 1 |
|   | ② | 172.17.1.4 | 172.17.1.3 | 1 | 1 |
| 4 | ① | 172.17.1.3 | 172.17.1.4 | 1 | 1 |
| 5 | ① | 172.17.1.2 | 172.17.1.5 | 1 | 1 |
|   | ② | 172.17.1.6 | 172.17.1.5 | 1 | 1 |
|   | ③ | 172.17.1.8 | 172.17.1.5 | 1 | 0 |
| 6 | ① | 172.17.1.5 | 172.17.1.6 | 1 | 1 |
|   | ② | 172.17.1.7 | 172.17.1.6 | 1 | 1 |
| 7 | ① | 172.17.1.6 | 172.17.1.7 | 1 | 1 |
|   | ② | 172.17.1.8 | 172.17.1.7 | 1 | 1 |
| 8 | ① | 172.17.1.5 | 172.17.1.8 | 1 | 0 |
|   | ② | 172.17.1.7 | 172.17.1.8 | 1 | 1 |

VERSION 2

FIG. 9

| RADIO BS NO. | PORT NO. | 1st IP ADDRESS | 2nd IP ADDRESS | COST | CONNECTION/ DISCONNECTION |
|---|---|---|---|---|---|
| 1 | ① | 172.17.1.2 | 172.17.1.1 | 1 | 1 |
| 2 | ① | 172.17.1.1 | 172.17.1.2 | 1 | 1 |
| | ② | 172.17.1.3 | 172.17.1.2 | 1 | 1 |
| | ③ | 172.17.1.5 | 172.17.1.2 | 1 | 1 |
| 3 | ① | 172.17.1.2 | 172.17.1.3 | 1 | 1 |
| | ② | 172.17.1.4 | 172.17.1.3 | 1 | 1 |
| 4 | ① | 172.17.1.3 | 172.17.1.4 | 1 | 1 |
| 5 | ① | 172.17.1.2 | 172.17.1.5 | 1 | 1 |
| | ② | 172.17.1.6 | 172.17.1.5 | 1 | 1 |
| | ③ | 172.17.1.8 | 172.17.1.5 | 1 | 1 |
| 6 | ① | 172.17.1.5 | 172.17.1.6 | 1 | 1 |
| | ② | 172.17.1.7 | 172.17.1.6 | 1 | 1 |
| 7 | ① | 172.17.1.6 | 172.17.1.7 | 1 | 1 |
| | ② | 172.17.1.8 | 172.17.1.7 | 1 | 0 |
| 8 | ① | 172.17.1.5 | 172.17.1.8 | 1 | 1 |
| | ② | 172.17.1.7 | 172.17.1.8 | 1 | 0 |
| | ③ | 172.17.1.9 | 172.17.1.8 | 1 | 1 |
| 9 | ① | 172.17.1.7 | 172.17.1.9 | 1 | 1 |

VERSION 3

FIG. 12

DYNAMIC ROUTING CONTROL SYSTEM AND METHOD FOR RADIO ACCESS NETWORK

BACKGROUND OF THE INVENTION

This invention relates to a routing control system for use in a radio access network and, in particular, to a routing control system of a dynamic routing type.

A radio access network system is used to connect computers with one another and to transmit packets among the computers. The computers are, for example, personal computers and/or workstations. The radio access network system comprises a plurality of base stations each of that is connectable to one of the computers by radio. The base stations adopt a point-to-point protocol to communicate with the computers respectively. Each of the computers can transmit a packet to any one of the other computers through the radio access network system.

A conventional base station used in the radio access network system includes a router adopting a routing information protocol (RIP) or an open Shortest path first (OSPF) method to control dynamic routing.

The RIP gives the radio access network a shortest path from a source base station to a destination base station. Furthermore, the RIP periodically makes the router exchange routing control information with adjacent routers to update a touring table memorized in the router, thereby the RIP can deals with a fault (such as a cutting) of a link between the base stations and with addition (or attachment) of an additional base station to the radio access network.

However, the RIP has a problem that a hop number is limited to a predetermined number. That is, the RIP can not route a packet when the number of the base stations on the shortest path between the source and the destination base stations is not smaller than the predetermined number.

The OSPF method is suitable for a large-scale network larger than a network such that the RIP is adopted because it does not have the above mentioned limitation of the hop number. In addition, the OSPF method decides a shorter route between the source and the destination base stations after consideration of traffic congestion of the network.

However, the OSPF method is an exaggerated method for the radio access network system such that the base stations are connected to the computers respectively by using the point-to-point protocol.

Additionally, both of the RIP and the OSPF method have a common problem that static routing control is necessary to avoid a state that the packet circulates in a loop included in the radio access network. That is, a network manager of the radio access network must pay attention to loops of the base stations. The problem mars degree of freedom regarding attaching/removing base station to/from the radio access network.

SUMMARY OF THE INVENTION

It is therefore an object of this invention to provide a dynamic routing system capable of routing without limitation of a hop number.

It is another object of this invention to provide a dynamic routing system having a scale suitable for a radio access network.

It is still object of this invention to provide a dynamic routing system capable of avoiding a state that a packet circulates in a loop included in a radio access network without static routing control by human hands.

Other object of this invention will become clear as the description proceeds.

According to a first aspect of this invention, a routing control system is for use in a network having a plurality of nodes. The nodes include a single master node and at least one slave node. The routing control system comprises a spanning tree producing portion provided in the master node. The spanning tree producing portion produces a spanning tree of the network on the basis of connection information of the network to deliver the spanning tree to each slave node whenever the connection information is received. A memorizing portion is provided in each of the nodes and memorizes the spanning tree delivered from the spanning tree producing portion as a routing table. A health check portion is provided in each of the nodes and sends the connection information to the spanning tree producing portion when topology change of the network is detected.

In the routing control system, the nodes may be base stations each of which is connectable to a single computer by radio.

In the routing control system, the network can be represented by a simple and undirected graph of a graph theory.

In the routing control system, the spanning tree producing portion uses the Dijkstra algorithm to make the spanning tree.

In the routing control system, the routing table includes a node number column for the nodes, a port number column for respective nodes, an IP address column for adjacent nodes, an IP address column for respective nodes, a cost column and a connection/disconnection information column.

In the routing control system, the health check portion detects fault between the node thereof and an adjacent node directly connected to the node thereof with referring to the routing table memorized in the memorizing portion of the node thereof to detect the topology change of the network.

In the routing control system, the health check portion detects that an additional node is directly connected to the node thereof with referring to the routing table memorized in the memorizing portion of the node concerned to detect the topology change of the network.

In the routing control system, the health check portion compares the routing table of the node thereof with that of an adjacent node directly connected to the node thereof to put the routing table into a newer state.

According to a second aspect of this invention, a routing controller is for use in a node of a network. The routing controller comprises a spanning tree producing portion which produces a spanning tree of the network on the basis of connection information of the network to deliver the spanning tree to each node of the network whenever the connection information is received. A memorizing portion is connected to the spanning tree producing portion and memorizes the spanning tree as a routing table. A health check portion is connected to the spanning tree producing portion which supplies the connection information of the network when topology change of the network is detected.

In the routing controller, the node is a base station connectable to a single computer by radio In the routing controller, the network can be represented by a simple and undirected graph of a graph theory.

In the routing controller, the spanning tree producing portion uses the Dijkstra algorithm to make the spanning tree.

According to a third aspect of this invention, a method of controlling a routing table is used in a network having a plurality of nodes. The nodes includes a single master node and at least one slave node. The method comprises the steps of producing, at the master node, a spanning tree of the network on the basis of connection information of the network to deliver the spanning tree to each slave node whenever the connection information is received, memorizing, at each of the nodes, the spanning tree delivered from the spanning tree producing portion as a routing table, and sending, from a health check portion of any one of nodes, the connection information to the spanning tree producing portion when topology change of the network is detected.

The method may further comprise the step of comparing, by the health check portion in each node, the routing table of the node concerned with that of an adjacent node directly connected to the node concerned to put the routing table into a newer state.

BRIEF DESCRIPTION OF THE DRAWING

FIG. 5 is a routing table on the basis of the spanning tree of FIG. 4;

FIG. 9 is a routing table on the basis of the spanning tree of FIG. 8;

FIG. 12 is a routing table on the basis of the spanning tree of FIG. 11.

DESCRIPTION OF THE PREFERRED EMBODIMENT

Referring to FIGS. 1 through 15, description will be made a dynamic routing control system according to a preferred embodiment of this invention.

Figure 1:
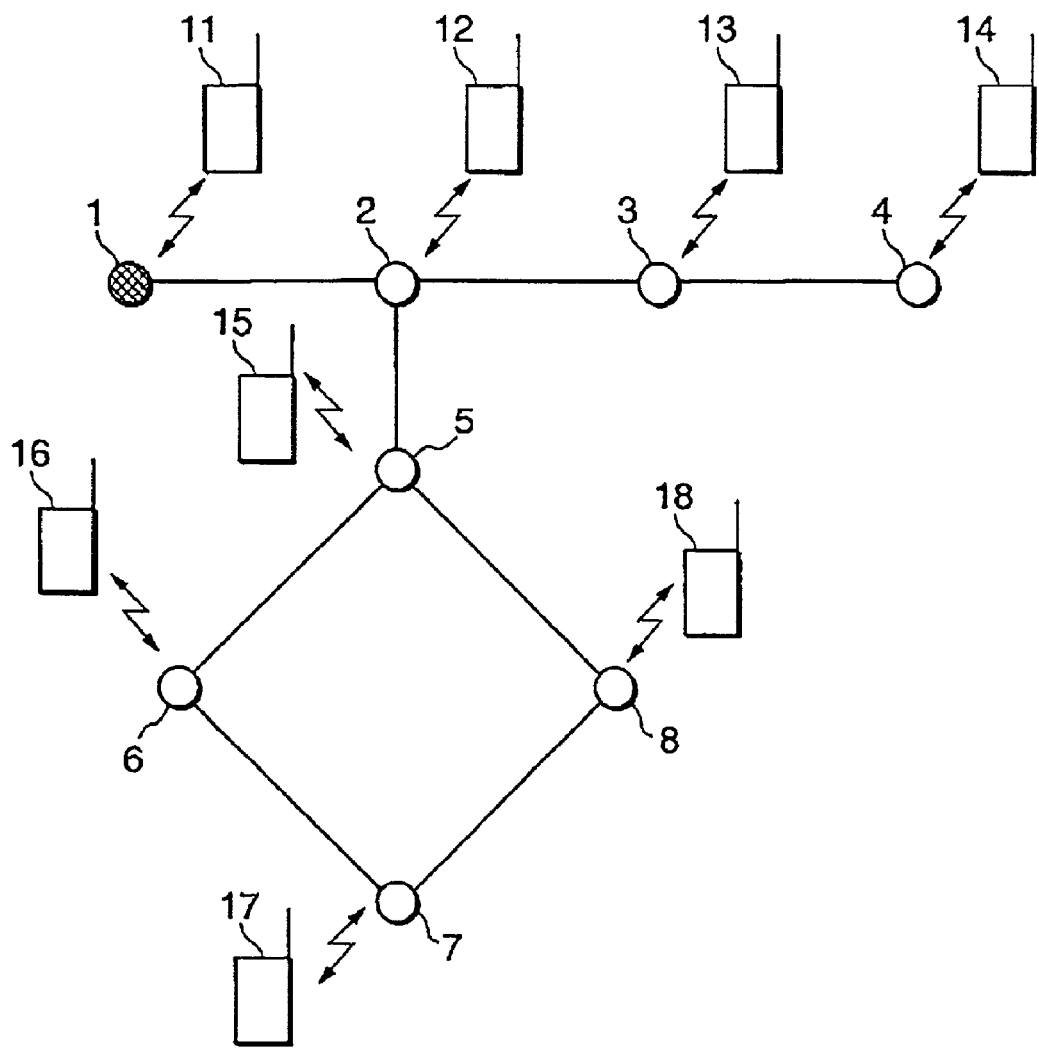
FIG. 1 shows a schematic topology of a radio access network applied with a dynamic routing control system according to a preferred embodiment of this invention.

FIG. 1 shows a schematic topology of a radio access network applied with the dynamic routing control system.

In FIG. 1, the radio access network comprises first through eighth radio base stations 1–8 connected to one another so as to form a simple and undirected graph of a graph theory. The first through the fourth base stations 1–4 are connected in a line while the fifth through the eighth base stations 5–8 are connected in a loop. Furthermore, the second base station 2 is connected to the fifth base station 5. The radio base station 1–8 are assigned with IP addresses as illustrated in FIG. 2.

The radio base stations 1–8 are connectable computers 11–18 respectively by radio. The computers 11–18 are connected to the radio base stations 1–8 by using a point-to-point protocol. Each of the computers 11–18 communicates with any one of the other computers through the radio access network.

One of the base stations 1–8 serves as a master base station and the remaining base stations serve as slave base stations. Hereinafter, it assumed that the first base station 1 is the master base station while the second through the eighth base stations are the slave stations.

Figures 2, 3A, 3B:
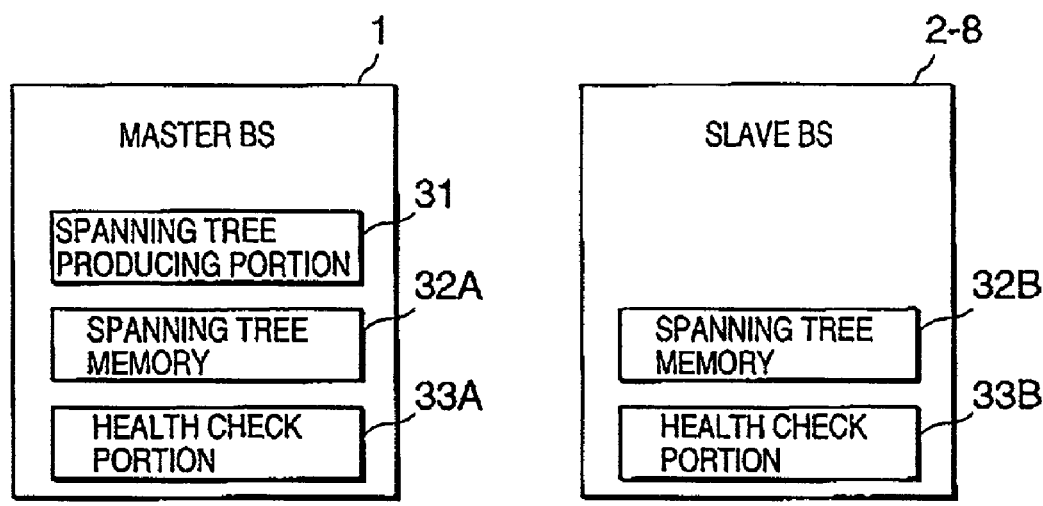
FIG. 2 is a table of IP address assigned to radio base stations of the radio access network of FIG. 1.
FIG. 3A is a block diagram of a master base station of the radio access network of FIG. 1.
FIG. 3B is a block diagram of a slave base station of the radio access network of FIG. 1.

As illustrated in FIG. 3A, the master base station 1 comprises a spanning tree producing portion 31, a spanning tree memory 32A and a health check portion 33A. On the other hand, as shown in FIG. 3B, each of the slave base stations 2–8 comprises a spanning tree memory 32B and a health check portion 33B. The spanning tree memory 32B of the slave base station is equal to the spanning tree memory 32A of the master base station 1. The health check portion 33B of the slave base station is partly different from the health check portion 33A of the master base station in operation. The slave base station may have the same structure as the master base station, if it is possible to change between a master base station's operation and a slave base station's operation.

Each of the base stations 1–8 further comprise a radio communication portion (not shown), a wired communication portion (not shown) and a control portion (not shown). The radio communication portion is for communicating with any one of the computer 11–18. The wired communication portion is for connecting to the radio access network. The control portion of the master base station 1 controls the spanning tree producing portion 31, the spanning tree memory 32A, the health check portion 33A, the radio communication portion and the wired communication potion. The control portion of each slave base station controls the spanning tree memory 32B, the health check portion 33B, the radio communication portion and the wired communication potion thereof.

The spanning tree producing portion 31 receives connection information representing the structure of the radio access network. In the initial state, the connection information may be supplied from the outside. Alternatively, the connection information may be gathered from the slave base stations in a manner as described in later. The spanning tree producing portion produces a spanning tree on the basis of the connection information. The spanning tree producing portion uses a program based on, for example, the Dijkstra algorithm to produce the spanning tree. The spanning tree is produced so that each of the slave base stations is connected to the master base station through the shortest path. The spanning tree is illustrated in FIG. 4.

Figure 4:
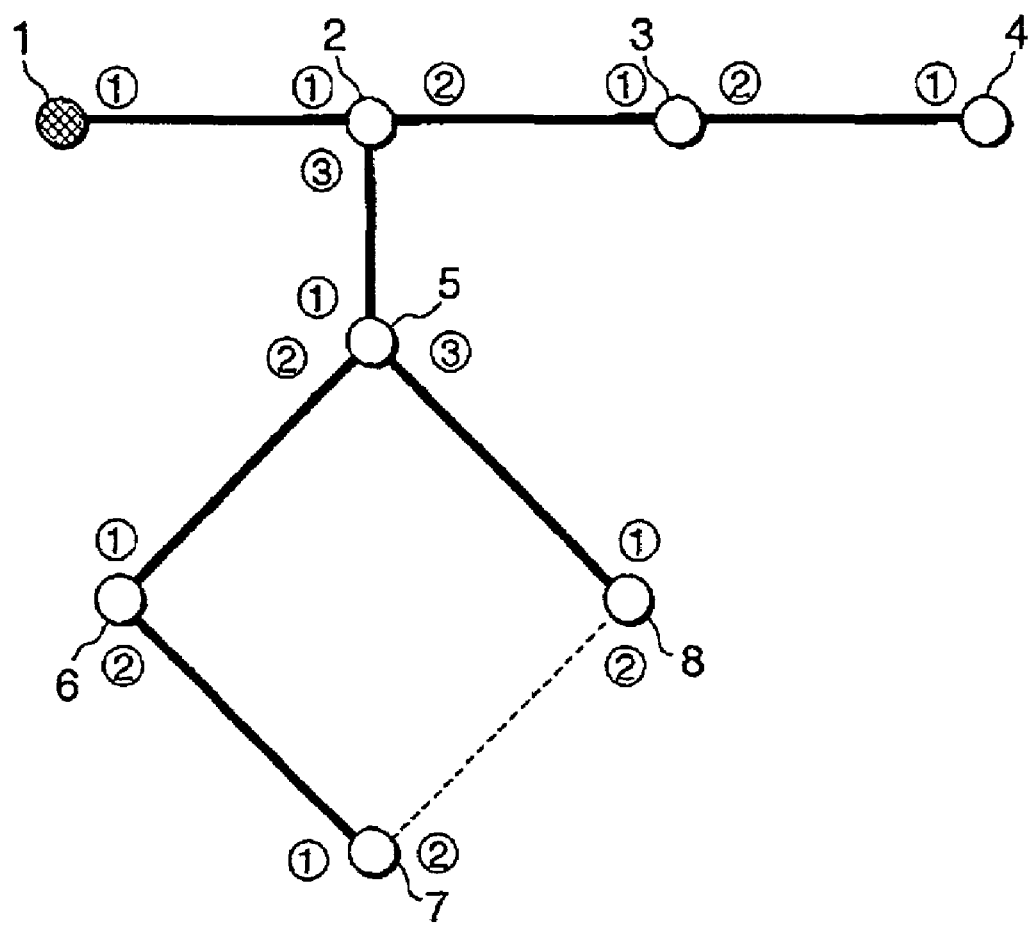
FIG. 4 shows a spanning tree corresponding to the radio access network of FIG. 1.

In FIG. 4, bold lines show usable paths for transmitting a packet while a broken line shows unusable (or waiting) path. The unusable path breaks the loop formed by the fifth through the eighth base stations 5–8 and thereby the packet is prevented from circulating in the loop.

Numerals in circles of FIG. 4 represent port numbers of respective base stations 1–8. For example, the second base station 2 comprises first to third ports connected to the first, the third and the fifth base stations 1, 3 and 5, respectively.

Returning to FIGS. 3A and 3B, the spanning tree producing portion 31 produces a table which represents the spanning tree of FIG. 4 and which has version information. The table is illustrated in FIG. 5. The spanning tree producing portion 31 delivers the table to the spanning tree memories 32A and 32B. The spanning tree producing portion 31 may broadcast the table in the radio access network to deliver the table to the spanning tree memories 32A and 32B. Alternatively, the spanning tree may supply only the table to the spanning tree memory 32A. In this case, the health check portions 33B update respective routing tables on the basis of the table memorized in the spanning tree memory 32A by a manner as mentioned later.

The spanning tree memory 32A receives the table supplied from the spanning tree producing portion 31 and memorizes it as a routing table. Each of the slave base stations 2–8 receives the table delivered from the master base station 1 and memorizes it in each spanning tree memory 32B as the routing table.

In FIG. 5, the routing table includes a radio base station number column for the serial numbers assigned to the radio base stations 1–8 in the radio access network. A port number column is for port numbers of respective radio base stations 1–8. A first IP address column is for IP addresses of adjacent base stations directly connected to the radio base stations corresponding to the radio base station number column. A second IP address column is for IP addresses of the radio base stations corresponding to the radio base station number column. A cost column is for path weight between respective base stations of the first IP address column and respective base stations of the second IP address column. In this embodiment, all of the path weight is equal to "1". A connection/disconnection information column is for flags representing whether respective paths are active or not. When the flag is equal to "1", the path is active. On the other hand, when the flag is equal to "0", the path is out or in a standby (or disconnection) state.

Returning again to FIGS. 3A and 3B, the health check portions 33A and 33B periodically detect topology change of the radio access network. That is, each of the health check portions 33A and 33B detects change of connection state between the base station thereof and the adjacent base stations. In addition, each of the health check portions 33B updates the routing table memorized in each spanning tree memory 32B by comparing the routing table with that of the adjacent base stations.

An operation of the dynamic routing control system will be made in below.

It is assumed that the eighth base station 8 wants to transmit a packet to the first base station 1. At first, the eighth base station 8 produce the packet including a destination IP address indicating the first base station 1. Then the eighth base station 8 looks the routing table memorized in the spanning tree memory 32B thereof. The routing table of FIG. 5 shows that it is not allowed to transmit the packet between the eighth base station 8 and the seventh base station 7. Accordingly, the eighth base station 8 transmits the packet to the fifth base station 5.

When the fifth base station 5 receives the packet transmitted from the eighth base station 8, it locks the destination IP address of the packet. The fifth base station 5 decides that the packet should be transmitted to the second base station 2 on the basis of the destination IP address with referring to the routing table thereof. The packet is transmitted from the fifth base station 5 to the second base station 2.

The second base station 2 operates like the fifth base station 5 and transmits the packet to the first base station 1.

Thus, the packet is transmitted from the eighth base station 8 to the first base station without falling into the loop. This is because the routing table is based on the spanning tree produced by the use of the Dijkstra algorithm.

Each base station can transmit a packet to any one of the other base stations and the packet does not circulate in the loop because each base station memorizes the routing table.

Besides, the routing table having no loop is easily obtained by using the Dijkstra algorithm.

A network manager does not have to pay attention to the loop and a burden on the network manager is reduced. In addition, the dynamic control system does not limit degree of freedom of the radio access network.

Next, the description is made about the operation of the dynamic control system in a case where fault (e.g. cutting) occurs between the fifth and the eighth base stations 5 and 8.

Figure 6:
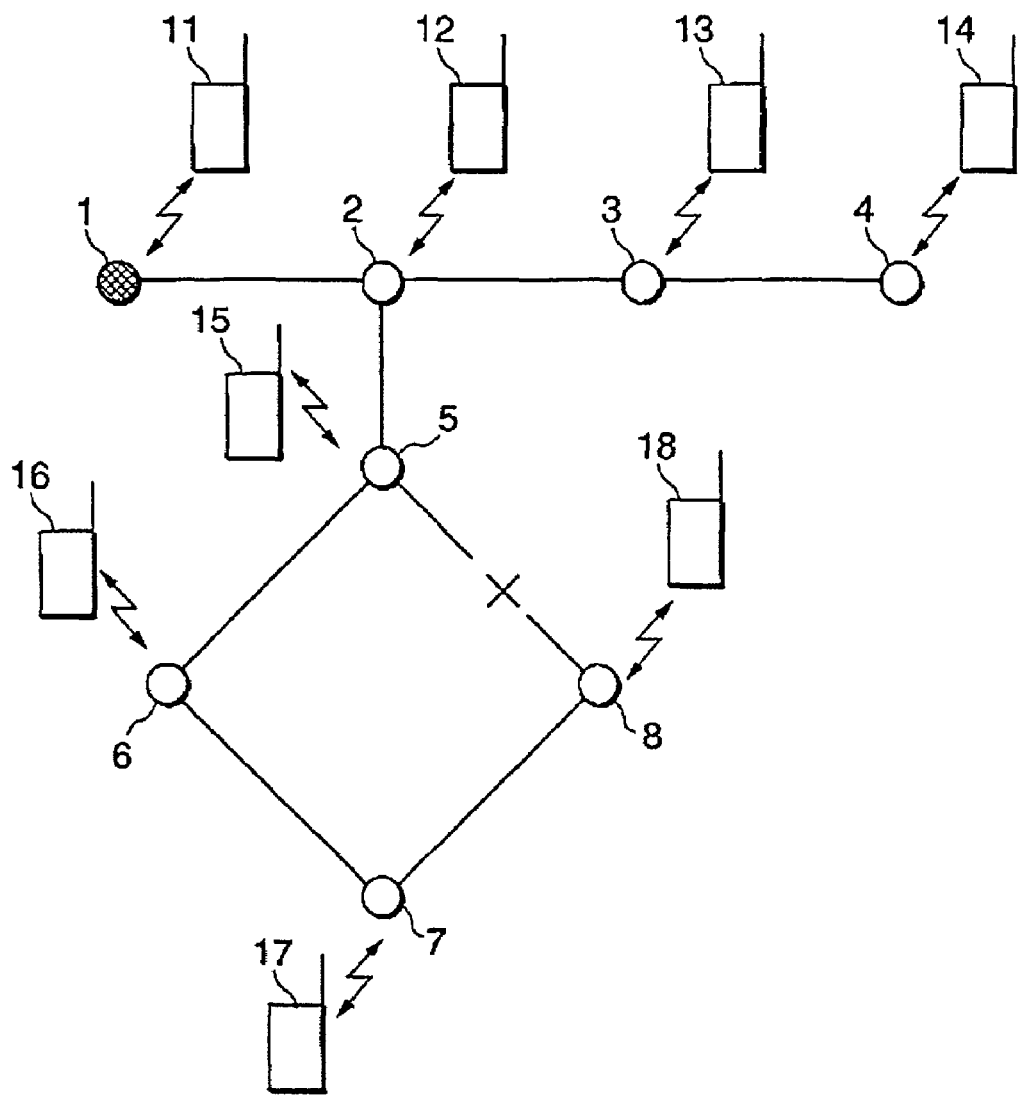
FIG. 6 shows a schematic topology of the radio access network of FIG. 1 when fault occurred between fifth and eighth base stations 5 and 8.

FIG. 6 shows the radio access network that the link is cut between the fifth and the eighth base stations 5 and 8.

The health check portion periodically exchanges various information for other health check portions of adjacent base stations to detect the topology change of the network. For example, the health check portion of the base station 5 periodically communicates with adjacent base stations 2, 6 and 8 to detect cutting of a link between the base station 5 and each of the adjacent base station 2, 6 and 8. When the health check portion of the base station 5 detects the cutting of the link between the base stations 5 and 8, it produces a message signal representing the cutting. The health check portion of the base station 5 transmits the message signal to the second base station 2 with referring to the routing table memorized in the spanning tree memory 32B of the base station 5. The second base station 2 receives the message signal and transmits it to the first base station 1 with referring to the routing table memorized in the spanning tree memory 32B thereof.

Though the health check portion of the eighth base station 8 also detects the cutting of the link between the base stations 5 and 8, the eighth base station 8 can not transmit a message representing the cutting. This is because the link between the eighth and the seventh base stations 8 and 7 is in the standby state.

In the first base station 1, when the health check portion receives the message signal transmitted from the eighth base station 8, it broadcasts a request signal on the radio access network in response to the message signal. The request signal requests each slave base station to detect the topology change of the radio access network and includes an ID number. Furthermore, the health check portion checks connection state between the first base station 1 and the adjacent base station 2.

In each slave base station, the health check portion memorizes a combination of the port number of the port receiving the request signal and the ID number included in the request signal when it receives the request signal from the first base station 1. The combination is used to not only discard the request signal having the same ID number as that of the combination but confirm connecting relations between its port(s) and the adjacent base station(s).

Figure 7:
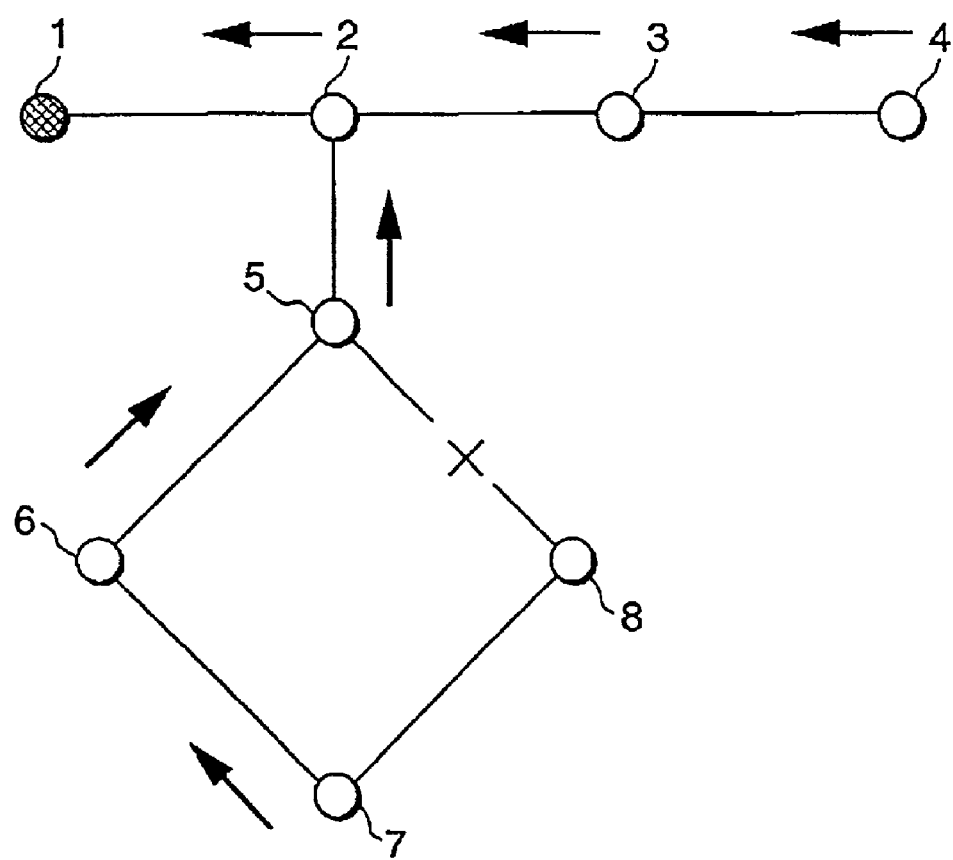
FIG. 7 shows flows of connection information transmitted from slave base stations to a master base station.

Next, the health check portion of each slave base station checks the connection state between the base station thereof and the adjacent base station(s). The health check portion produces the connection information including the IP address of each adjacent base station, the port number of the port connected to each adjacent base station, the cost of the link for each adjacent base station, the connection/disconnection information of the link, and the IP address of the base station thereof. The connection information is transmitted to the first base station 1 with referring to the routing table memorized in each spanning tree memory 32B. FIG. 7 shows a flow of the connection information transmitted from the slave base stations 2–8.

Though the link between the seventh and the eighth base stations 7 and 8 is in the standby state, the health check portions of the base stations 7 and 8 check the connection state of the link in cooperation with each other. The seventh base station 7 transmits the connection information including information of the eighth base station 8 to the first base station 1. Furthermore, the fifth base station 5 transmits the connection information including information that the link between it and the eighth base station 8 is cut.

In the first base station 1, the spanning tree producing portion 31 waits the connection information transmitted from the health check portions 33A and 33B. The spanning tee producing portion 31 judges that the connection information is transmitted from all of the health check portions 33A and 33b when a predetermined time is elapsed from when the request signal is broadcasted. The spanning tree producing portion 31 produces a new spanning tree by the Dijkstra algorithm on the basis of the connection information transmitted from the health check portions 33A and 33b. The new spanning tree is illustrated in FIG. 8.

Figure 8:
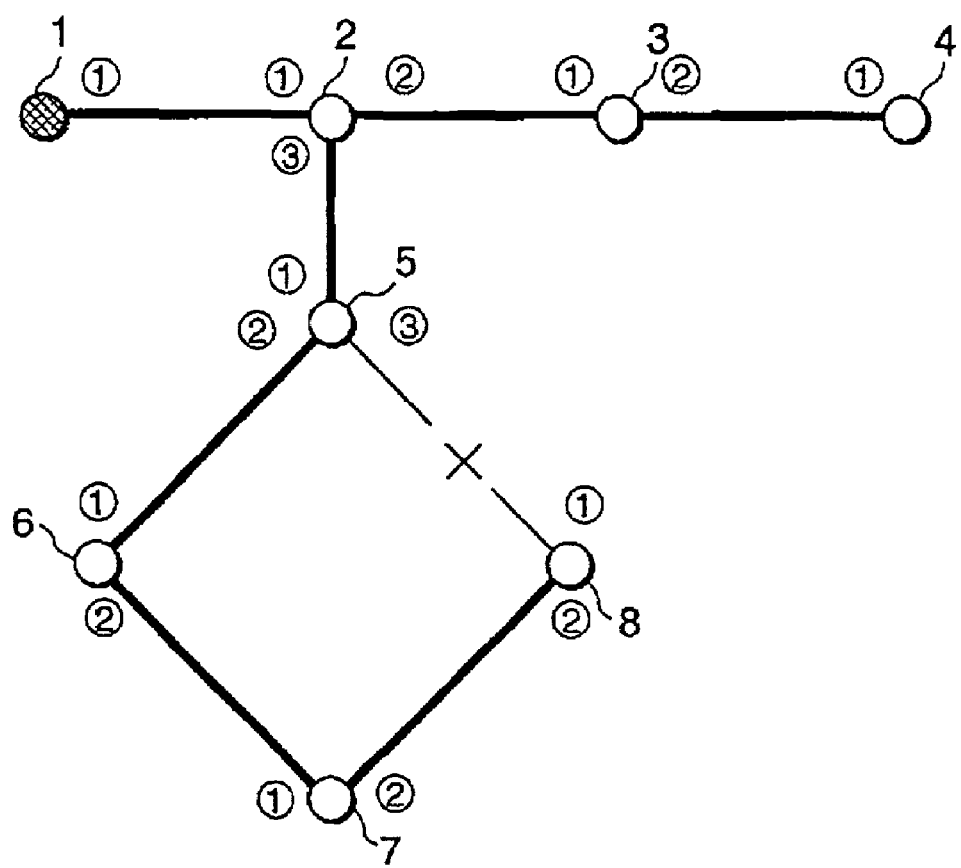
FIG. 8 shows a spanning tree corresponding to the radio access network of FIG. 6.

In FIG. 8, the link between the eighth base station 8 and the seventh base station 7 is changed from the standby state into an active state. Because the link is cut between the eighth base station 8 and the fifth base station 5, the radio access network has no loop.

In addition, the spanning tree producing portion 31 produces a new (or a second version) table representing the new spanning tree. The new table is illustrated in FIG. 9. The spanning tree producing portion 31 stores the new spanning tree in the spanning tree memory 32A.

Each of the health check portions 33A and 33b periodically exchanges the version information of the routing table memorized in each spanning tree memory for those of the adjacent base stations. If the health check portion find that the adjacent base station has the newer version routing table, it updates the routing table memorized in the spanning tree memory of the base station thereof. Consequently, all of the spanning tree memories 33B are rewritten one after another, when the spanning tree memory 33A is rewritten.

Thus, the dynamic routing control system can deal with the topology change of the radio access network and enables the network to route the packet to any one of the base stations 1–8. For instance, a packet from the eighth base station 8 to the first base station 1 is transmitted through the seventh base station 7, the sixth base station 6, the fifth base station 5 and the second base station 2 in this order, as easily understood from FIG. 8.

If the link is restored between the fifth and the eighth base station 5 and 8, each of the fifth and the eighth base stations produces a message signal representing the restoration to supply it to the first base station 1.

When the first base station 1 receives the message signals sent from the fifth and the eighth base stations 5 and 8, it changes the routing table memorized in the spanning tree memory 32A in a manner as mentioned above. Consequently, the routing table of each base station 1–8 is returned from that of FIG. 9 to that of FIG. 5.

Next, description is made about a case where another base station is connected or attacked to the radio access network.

In each base station 1–8, if it has an unused port, the health check portion thereof periodically checks whether the other base station is connected to the unused port or not.

Figure 10:
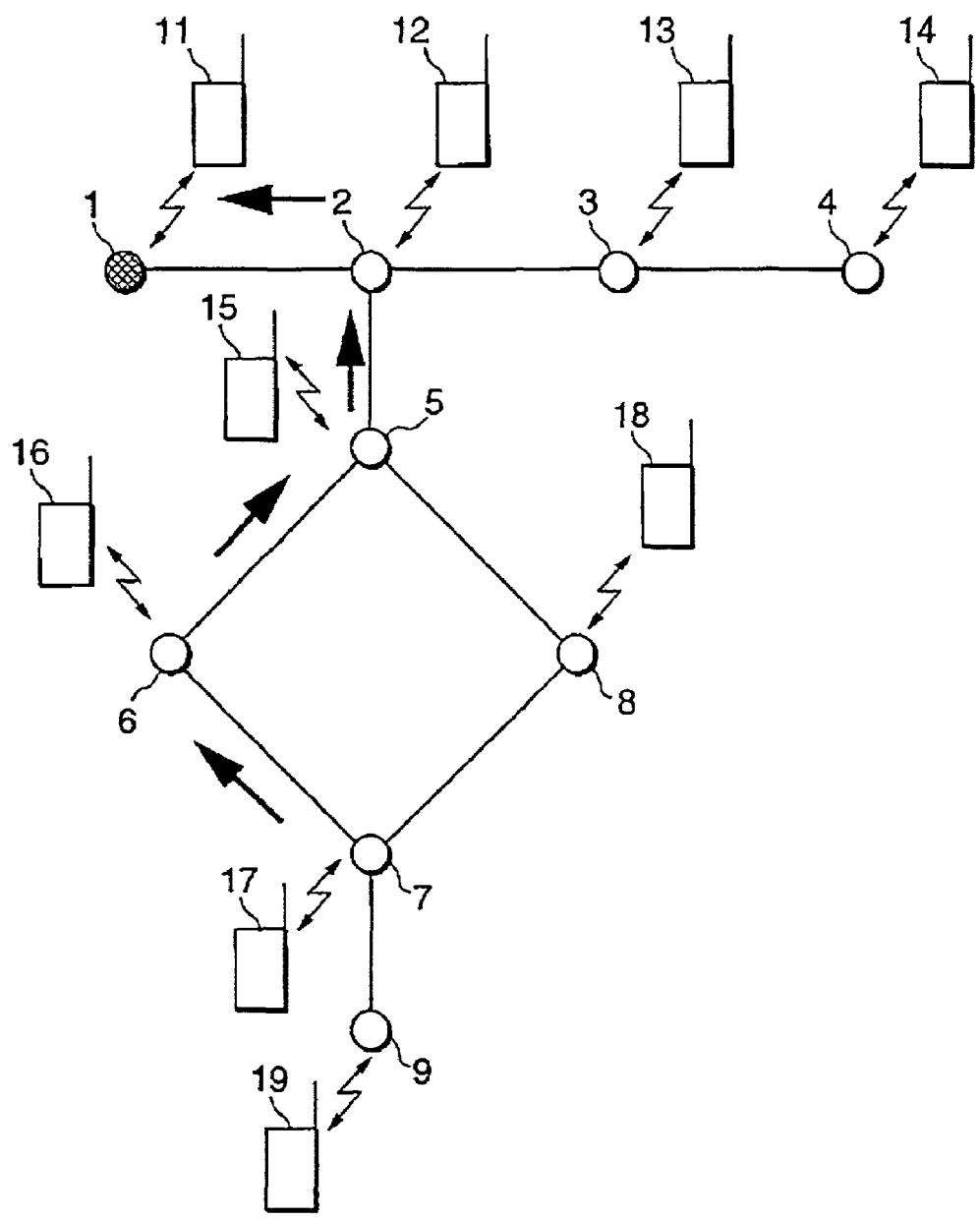
FIG. 10 shows a schematic topology of the radio access network of FIG. 1 when another base station is connected to a seventh base station 7.

Referring to FIG. 10, the other base station 9 is directly connected to the seventh base station 7. In the seventh base station 7, the health check portion detects that the ninth base station 9 is connected to the third port of the seventh base station 7. Then the heals check portion of the seventh base station 7 produces a message signal representing the addition of the ninth base station 9 and transmits the message signal to the first base station 1. The message signal transmitted from the seventh base station 7 is sent to the fist base station 1 through the sixth, the fifth and the second base stations 6, 5 and 2 on the basis of the routing table of FIG. 9.

Figure 11:
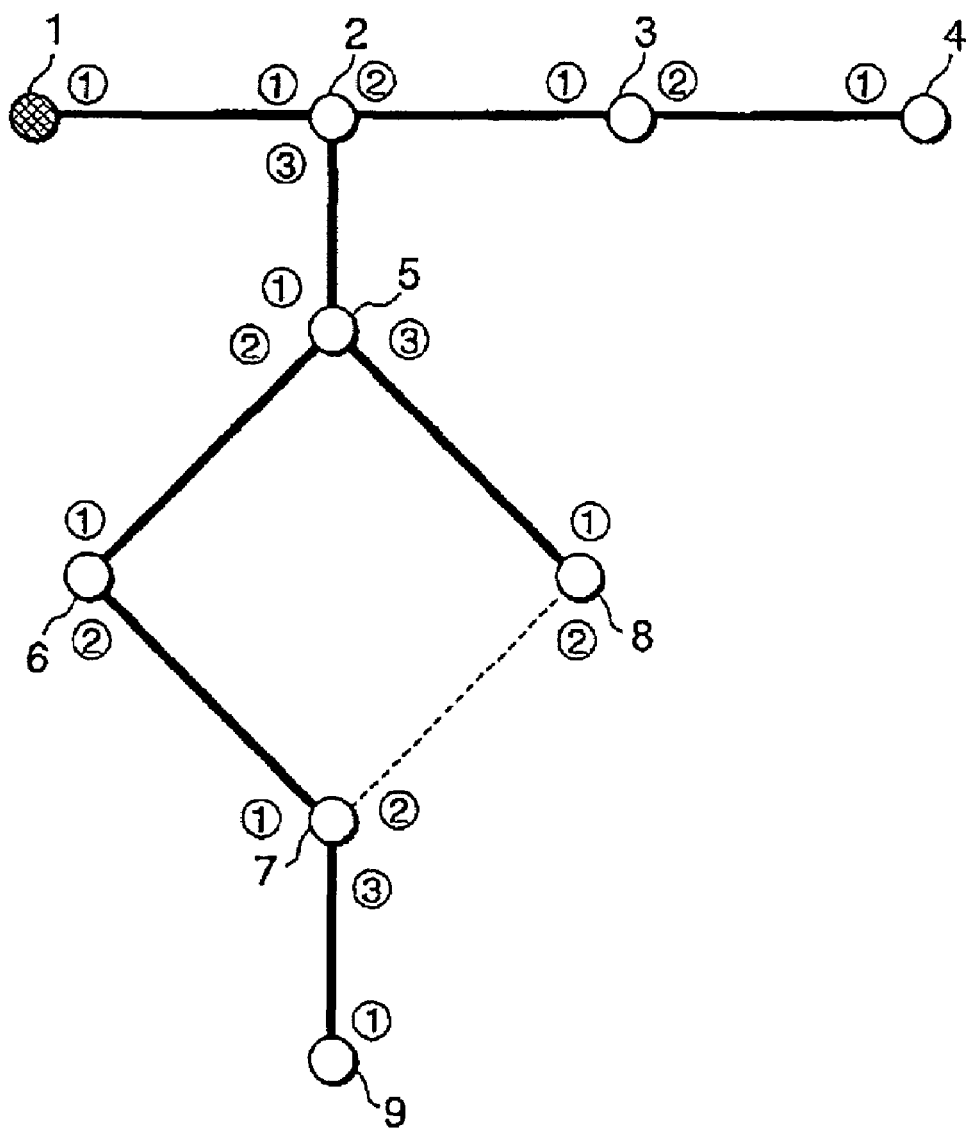
FIG. 11 shows a spanning tree corresponding to the radio access network of FIG. 10.

When the first base station 1 receives the message signal representing the addition of the ninth base station 9, it produces a new spanning tree in a manner as mentioned above. The new spanning tree is illustrated in FIG. 11. The spanning tree producing portion 31 is further produces a new (or a third version) table representing the new spanning tree. The table is illustrated in FIG. 12. The spanning tree producing portion 31 stores the table into the spanning tree memory 32A of the first base station 1. The health check portions 33B of the slave base stations 2–9 update the respective routing tables one after another in response to change of the routing table of the first base station 1.

As easily understood from FIG. 11, when the ninth base station 9 transmits a packet to the first base station 1, the packet passes through the seventh, the sixth, the fifth and the second base stations 7, 6, 5 and 2. Because the link between the seventh and the eighth base stations 7 and 8 is in the standby state, the packet does not circulate in the loop.

Thus, the dynamic routing control system can deal with addition of the other base station and produce a new routing table corresponding to the other base station.

While this invention has thus far been described in conjunction with the preferred embodiment thereof, it will readily be possible for those skilled in the art to put this invention into practice in various other manners. For example, the dynamic routing control system can be applied to a wired network.

What is claimed is:

1. A routing control system for use in a network having a plurality of nodes, said nodes including at least one master node and at least two slave nodes, said routing control system comprising:
    a spanning tree producing portion provided in said master node which produces a spanning tree of said network based on connection information of said network and which delivers said spanning tree to each slave node whenever said connection information is received;
    a memorizing portion provided in each of said nodes which memorizes said spanning tree delivered from said spanning tree producing portion as a routing table; and
    a health check portion provided in each of said nodes which sends said connection information to said spanning tree producing portion when a topology change of said network is detected;
    wherein said a spanning tree comprises a representation of a topology of said network and comprises connection information regarding at least one node that is not directly connected to said master node.

2. A routing control system as claimed in claim 1, wherein said nodes are base stations each of which is connectable to a single computer by radio.

3. A routing control system as claimed in claim 1, wherein said network can be represented by a simple and undirected graph of a graph theory.

4. A routing control system as claimed in claim 1, wherein said spanning tree producing portion uses a Dijkstra algorithm to make said spanning tree.

5. A routing control system as claimed in claim 1, wherein said routing table includes a node number column for said nodes, a port number column for respective nodes, an IP address column for adjacent nodes, an IP address column for respective nodes, a cost column and a connection/disconnection information column.

6. A routing control system as claimed in claim 1, wherein said health check portion detects fault between the node thereof and an adjacent node directly connected to the node thereof and refers to said routing table memorized in said memorizing portion of the node thereof to detect said topology change of said network.

7. A routing control system as claimed in claim 6, wherein said health check portion of any slave node transmits a message signal to said health check portion of said master node when the fault is detected;
wherein said health check portion of said master node broadcasts a request signal on said network when said message signal is received; and
wherein said health check portion of each slave node sends said connection information to said spanning tree producing portion in response to said request signal.

8. A routing control system as claimed in claim 1, wherein said health check portion detects that an additional node is directly connected to the node thereof and refers to said routing table memorized in said memorizing portion of the node thereof to detect said topology change of said network.

9. A routing control system as claimed in claim 8, wherein said health check portion of any slave node transmits a message signal to said health check portion of said master node when the additional node is detected;
wherein said health check portion of said master node broadcasts a request signal on said network when said message signal is received; and
wherein said health check portion of each slave node sends said connection information to said spanning tree producing portion in response to said request signal.

10. A routing control system as claimed in claim 9, wherein said health check portion of each slave node comprises a plurality of ports directly connected to adjacent nodes; and
wherein said health check portion of each slave node receives said request signal at one of ports and transmits it from the remaining ports to said adjacent nodes.

11. A routing control system as claimed in claim 10, wherein said request signal includes an ID number; and
wherein said health check portion refers to said ID number and discards said request signal when said health check portion has already received a request signal including an identical ID number.

12. A routing control system as claimed in claim 9, wherein said health check portion memorizes a port number of said port receiving said request signal to produce said connection information.

13. A routing control system as claimed in claim 1, wherein said health check portion compares said routing table of the node thereof with that of an adjacent node directly connected to the node thereof to put said routing table into a newer state.

14. A routing controller for use in a node of a network comprising plurality of nodes, said routing controller comprising:

a spanning tree producing portion which produces a spanning tree of said network based on connection information of said network and which delivers said spanning tree to each node of said network whenever said connection information is received;
a memorizing portion connected to said spanning tree producing portion which memorizes said spanning tree as a routing table; and
a health check portion connected to said spanning tree producing portion which supplies said connection information of said network when a topology change of said network is detected;
wherein said spanning tree comprises a representation of a topology of said network and comprises connection information regarding at least one node that is not directly connected to said node of the network.

15. A routing controller as claimed in claim 14, wherein said node is a base station connectable to a single computer by radio.

16. A routing controller as claimed in claim 14, wherein said network can be represented by a simple and undirected graph of a graph theory.

17. A routing controller as claimed in claim 14, wherein said spanning tree producing portion uses a Dijkstra algorithm to make said spanning tree.

18. A method of controlling a routing table used in a network having a plurality of nodes, said nodes including at least one master node and at least two slave nodes, comprising:

producing, at said master node, a spanning tree of said network based on connection information of said network and which delivers said spanning tree to each slave node whenever said connection information is received;
memorizing, at each of said nodes, said spanning tree delivered from said spanning tree producing portion as a routing table; and
sending, from a health check portion of any one of nodes, said connection information to said spanning tree producing portion when a topology change of said network is detected;
wherein said spanning tree comprises a representation of a topology of said network and comprises connection information regarding at least one node that is not directly connected to said master node.

19. A method as claimed in claim 18, wherein said method further comprising:

comparing, by said health check portion, said routing table of the node thereof, with that of an adjacent node directly connected to the node thereof to put said routing table into a newer state.

20. A routing control system as claimed in claim 1, wherein said spanning tree comprises an interconnection of all nodes in the network.

* * * * *